United States Patent
Shi

(10) Patent No.: US 10,306,601 B2
(45) Date of Patent: May 28, 2019

(54) HANDLING THE AMBIGUITY OF THE SENDING OF HS-SCCH ORDER IN NODE B

(71) Applicant: TELEFONAKTIEBOLAGET L M ERICSSON (PUBL), Stockholm (SE)

(72) Inventor: Nianshan Shi, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 560 days.

(21) Appl. No.: 14/824,642

(22) Filed: Aug. 12, 2015

(65) Prior Publication Data

US 2016/0066308 A1 Mar. 3, 2016

Related U.S. Application Data

(60) Provisional application No. 62/045,164, filed on Sep. 3, 2014.

(51) Int. Cl.
*H04W 72/04* (2009.01)
*H04L 1/00* (2006.01)
*H04L 5/00* (2006.01)
*H04W 88/12* (2009.01)

(52) U.S. Cl.
CPC ....... *H04W 72/0406* (2013.01); *H04L 1/0007* (2013.01); *H04L 1/0078* (2013.01); *H04L 5/0092* (2013.01); *H04L 5/0085* (2013.01); *H04W 88/12* (2013.01)

(58) Field of Classification Search
CPC ... H04L 1/0007; H04L 1/0078; H04L 5/0085; H04L 5/0092; H04W 72/0406; H04W 88/12

USPC ......................................................... 370/336
See application file for complete search history.

(56) References Cited

U.S. PATENT DOCUMENTS

| | | | | |
|---|---|---|---|---|
| 2005/0207374 A1* | 9/2005 | Petrovic | ................ | H04W 28/26 370/331 |
| 2005/0239435 A1* | 10/2005 | Ikeda | ....................... | H04L 47/10 455/403 |
| 2009/0034474 A1* | 2/2009 | Yavuz | ................... | H04L 1/0007 370/331 |
| 2012/0039294 A1* | 2/2012 | Yan | ....................... | H04W 36/06 370/329 |

(Continued)

FOREIGN PATENT DOCUMENTS

WO 2014120061 A1 8/2014

OTHER PUBLICATIONS

Huawei, et al. Comparison of E-DCH TTI switching methods. 3GPP TSG RAN WG2 Meeting #84 R2-133894. San Francisco, USA, Nov. 11-15, 2013.

(Continued)

*Primary Examiner* — Natasha W Cosme

(57) ABSTRACT

A method in a network node is disclosed. The method comprises receiving, from a radio network controller (RNC), a request to send a high speed signaling control channel (HS-SCCH) order to a user equipment (UE) according to one of a first or second fast Transmission Time Interval (TTI) switching mode, the HS-SCCH order indicating that the UE should perform TTI switching. The method further comprises communicating, to the RNC in response to receiving the request to send the HS-SCCH order to the UE, feedback indicating a fast TTI switching mode supported by the network node.

20 Claims, 13 Drawing Sheets

(56) References Cited

U.S. PATENT DOCUMENTS

2013/0083780 A1* 4/2013 Luo .................. H04W 72/0406
　　　　　　　　　　　　　　　　　　　　　　　　370/336

OTHER PUBLICATIONS

Huawei, et al. Discussion on the issues with reconfiguration procedure for 2ms and 10ms TTI. 3GPP TSG RAN WG2 Meeting #82 R2-131857. Fukuoka, Japan, May, 20-24, 2013.

3rd Generation Partnership Project; Technical Specification Group Radio Access Network; UTRAN Iub interface Node B Application Part (NBAP) Signalling (Release 12) 3GPP TS 25.433 V12.1.0 (Jun. 2014).

3rd Generation Partnership Project; Technical Specification Group Radio Access Network; UTRAN Iur interface Radio Network Subsystem Application Part (RNSAP) signalling (Release 12). 3GPP TS 25.423 V12.1.0 (Jun. 2014).

\* cited by examiner

FIGURE 5A

| | | | | | |
|---|---|---|---|---|---|
| | | | | YES | Ignore |
| Sending HS-SCCH order support mode indicator | 0 | | ENUMERATED (Alternative Way Supported, Alternative Way Not Supported, Legacy Supported, Legacy Not Supported) | timeslot 2. Bit 3 is for timeslot 3. Bit 4 is for timeslot 4. Bit 5 is for timeslot 5. Bit 6 is for timeslot 6. The value 0 of a bit means the corresponding timeslot is not allocated for non-rectangular resource. The value 1 of a bit means the corresponding timeslot is allocated for non-rectangular resource. Bit 0 is the first/leftmost bit of the bit string. Indicate which way Node B could send HS-SCCH order | |

9.1.44 RADIO LINK RECONFIGURATION FAILURE

| IE/Group Name | Presence | Range | IE Type and Reference | Semantics Description | Criticality | Assigned Criticality |
|---|---|---|---|---|---|---|
| Message Discriminator | M | | 9.2.1.45 | | – | |
| Message Type | M | | 9.2.1.46 | | YES | reject |
| Transaction ID | M | | 9.2.1.62 | | – | |
| CRNC Communication Context ID | M | | 9.2.1.18 | The reserved value "All CRNCCC" shall not be used. | YES | ignore |
| CHOICE Cause Level | M | | | | YES | ignore |
| >General | | | | | | |
| >>Cause | M | | 9.2.1.6 | | YES | ignore |
| >RL Specific | | | | | | |
| >>RLs Causing Reconfiguration Failure | | 0..<maxNrOfRLs> | | | EACH | ignore |
| >>>RL ID | M | | 9.2.1.53 | | – | |
| >>>Cause | M | | 9.2.1.6 | | YES | ignore |
| Criticality Diagnostics | O | | 9.2.1.17 | | YES | ignore |
| Sending HS-SCCH order support mode indicator | O | | ENUMERATED (Alternative Way Supported, Alternative Way Not Supported, Legacy Supported, Legacy Not Supported) | Indicate which way Node B could send HS-SCCH order | YES | ignore |

FIGURE 6

9.1.45 RADIO LINK RECONFIGURATION COMMIT

| IE/Group Name | Presence | Range | IE Type and Reference | Semantics Description | Criticality | Assigned Criticality |
|---|---|---|---|---|---|---|
| Message Discriminator | M | | 9.2.1.45 | | – | |
| Message type | M | | 9.2.1.46 | | YES | ignore |
| Transaction ID | M | | 9.2.1.82 | | – | |
| Node B Communication Context ID | M | | 9.2.1.48 | The reserved value "All NBCC" shall not be used. | YES | ignore |
| CFN | M | | 9.2.1.7 | FDD only | YES | ignore |
| Active Pattern Sequence Information | O | | 9.2.2.A | FDD only | YES | ignore |
| Fast Reconfiguration Mode | O | | 9.2.2.62 | | YES | reject |
| Sending HS-SCCH Mode | O | | ENUMERATED (Alternative Way Requested, ...) | Indicate how the sending of HS-SCCH order has been requested. | YES | reject |

FIGURE 7

HANDLING THE AMBIGUITY OF THE SENDING OF HS-SCCH ORDER IN NODE B

PRIORITY

This application claims the benefit under 35 U.S.C. § 119(e) of the priority of U.S. Provisional Application 62/045,164 filed on Sep. 3, 2014, entitled "Handling the Ambiguity of the Sending of HS-SCCH Order in Node B," the entire disclosure of which is hereby incorporated by reference.

TECHNICAL FIELD

The present disclosure relates, in general, to wireless communications and, more particularly, to handling the ambiguity of the sending of HS-SCCH order in Node B.

BACKGROUND

The Work Item "Further EUL Enhancements" has been agreed in 3GPP Release 12. One aspect is improving the EUL coverage via improved Transmission Time Interval (TTI) switching (e.g., switching between 10 ms TTI and 2 ms TTI). To assist with TTI switching, a High Speed-Shared Control Channel (HS-SCCH) order with the specific value is sent from the serving network nodes (such as a Node B) to the user equipment (UE) to perform the TTI switching.

The decision to trigger the TTI switch (e.g., 2 ms to 10 ms or 10 ms to 2 ms) can be taken autonomously by the serving network node or by a radio network controller (RNC), such as a serving RNC. In the case that the RNC makes the decision, the RNC will need to inform the serving network node of this decision, and the serving network node should send the HS-SCCH order to the UE so the TTI switching process can be started. According to legacy procedures, the HS-SCCH order is sent at the reception of RADIO LINK RECONFIGURATION COMMIT message. There are different interpretations, however, of how much the RNC can control. For example, the RNC may request the network node to send the HS-SCCH order in a different way (i.e., alternative way) than what is specified in the legacy system.

When TTI switching is performed, the network node and UE should do the hand shake (i.e., the network node sends a HS-SCCH order to the UE and the UE sends back the acknowledgement). The UE will go to the new TTI according to the specification. At the network node side, there are different ways to let the network node go to the new TTI. According to legacy procedures, Radio Link Reconfiguration is used.

In the current RAN3 NBAP and RNSAP specification (TS 25.433 and TS 25.423), there is a legacy procedure that the HS-SCCH order is sent at the reception of RADIO LINK RECONFIGURATION COMMIT when synchronized Radio Link Reconfiguration procedure is used. If an alternative solution is introduced to request Node B to send the HS-SCCH order in a different message, or in a specified time when using the synchronized Radio Link Reconfiguration procedure, this will cause ambiguity.

If the RNC requests that the network node send the HS-SCCH order in the alternative way, but the network node does not support the alternative way, then the network node may ignore the request from the RNC. The RNC, however, may not be informed that the request was ignored by the network node. If the network node understands there is an ongoing TTI switching operation, the network node may send the HS-SCCH order when a RADIO LINK RECONFIGURATION COMMIT message is received. If the network node does not understand there is an ongoing TTI switching operation, the network node will not send any HS-SCCH order. If the network node sends the HS-SCCH order at the reception of the RADIO LINK RECONFIGURATION COMMIT message, the TTI switching operation can be performed, but since the RNC and the network node have different understanding on when the HS-SCCH order is sent, it may cause the network node to switch to the new configuration at the wrong time. This may cause further network node and UE mismatch. If the network node does not send any HS-SCCH order, then at the reception of the RADIO LINK RECONFIGURATION COMMIT message, it will follow the legacy procedure and go to the new configuration (for example, new TTI). This is likely to cause problems, as the UE will still be using the old configuration.

There may also be ambiguity when the network node only supports the alternative way, but not the legacy way. For example, if the RNC uses the legacy way, it considers that at the reception of the RADIO LINK RECONFIGURATION COMMIT message, the Node B shall send HS-SCCH order to the UE. If the network node does not support the legacy way, the network node would not send any order. In such a case, when the network node receives the RADIO LINK RECONFIGURATION COMMIT message, it will go to the new configuration according to the current specification, but the UE will still be using the old configuration.

SUMMARY

To address the foregoing problems with existing solutions, disclosed is a method in a network node. The method comprises receiving, from an RNC, a request to send a HS-SCCH order to a UE according to one of a first or second fast TTI switching mode, the HS-SCCH order indicating that the UE should perform TTI switching. The method further comprises communicating, to the RNC in response to receiving the request to send the HS-SCCH order to the UE, feedback indicating a fast TTI switching mode supported by the network node.

In certain embodiments, the method may further comprise communicating capability information to the RNC prior to receiving the request to send the HS-SCCH order to the UE, the capability information indicating one or more fast TTI switching modes supported by the network node. The method may further comprise receiving, from the RNC in response to the communicated feedback indicating the fast TTI switching mode supported by the network node, one of: a message indicating that the network node should send the HS-SCCH order; a message indicating to the network node that the network node should change to a new TTI switching configuration; and an indication that an ongoing radio link reconfiguration has been canceled.

In certain embodiments, the request to send the HS-SCCH order to the UE according to one of the first or second fast TTI switching mode may be included in a RADIO LINK RECONFIGURATION PREPARE message. A request to send the HS-SCCH order according to the first fast TTI switching mode may comprise an instruction to the network node to prepare to send the HS-SCCH order upon receiving the request and to send the HS-SCCH order to the UE upon receiving the message indicating that the network node should send the HS-SCCH order. A request to send the HS-SCCH order according to the second fast TTI switching mode may comprise an instruction to the network node to send the HS-SCCH order to the UE at a connection frame number (CFN) indicated in the request and to change to the new TTI switching configuration upon receiving the message indicating that the network node should change to the new TTI switching configuration.

In certain embodiments, the communicated feedback indicating the fast TTI switching mode supported by the network node may be included in one of a RADIO LINK RECONFIGURATION READY message and a RADIO LINK RECONFIGURATION FAILURE message. The communicated feedback indicating the fast TTI switching mode supported by the network node may be included in a RADIO LINK RECONFIGURATION READY message, and the received one of the message indicating that the network node should send the HS-SCCH order and the message indicating to the network node that the network node should change to the new TTI switching configuration may comprise a RADIO LINK RECONFIGURATION COMMIT message. The received message may comprise the message indicating that the network node should send the HS-SCCH order, and the RADIO LINK RECONFIGURATION COMMIT message may include an activation delay comprising timing information sent to the UE by the RNC, the activation delay for use by the network node to determine when the network node should change to the new TTI switching configuration.

In certain embodiments, the request to send the HS-SCCH order according to one of the first or second fast TTI switching mode may be included in a RADIO LINK RECONFIGURATION REQUEST message. A request to send the HS-SCCH order according to the first fast TTI switching mode may comprise an instruction to the network node to send the HS-SCCH order to the UE upon receiving the request to send the HS-SCCH order to the UE. A request to send the HS-SCCH order according to the second fast TTI switching mode may comprise an instruction to the network node to send the HS-SCCH order to the UE at a CFN indicated in the request to send the HS-SCCH order. The communicated feedback indicating the fast TTI switching mode supported by the network node may be included in a RADIO LINK RECONFIGURATION RESPONSE message.

Also disclosed is a network node. The network node comprises one or more processors. The one or more processors are configured to receive, from an RNC, a request to send a HS-SCCH order to a UE according to one of a first or second fast TTI switching mode, the HS-SCCH order indicating that the UE should perform TTI switching. The one or more processors are configured to communicate, to the RNC in response to receiving the request to send the HS-SCCH order to the UE, feedback indicating a fast TTI switching mode supported by the network node.

Also disclosed is a method in a radio network controller. The method comprises communicating, to a network node, a request to send a HS-SCCH order to a UE according to one of a first or second fast TTI switching mode, the HS-SCCH order indicating that the UE should perform TTI switching. The method further comprises receiving, from the network node in response to the communicated request to send the HS-SCCH order to the UE, feedback indicating a fast TTI switching mode supported by the network node.

In certain embodiments, the method may further comprise receiving capability information from the network node prior to communicating the request to send the HS-SCCH order to the UE, the capability information indicating one or more fast TTI switching modes supported by the network node. The method may further comprise communicating, to the network node in response to the received feedback indicating the fast TTI switching mode supported by the network node, one of: a message indicating that the network node should send the HS-SCCH order; a message indicating to the network node that the network node should change to a new TTI switching configuration; and an indication that an ongoing radio link reconfiguration has been canceled.

In certain embodiments, the request to send the HS-SCCH order to the UE according to one of the first or second fast TTI switching mode may be included in a RADIO LINK RECONFIGURATION PREPARE message. A request to send the HS-SCCH order according to the first fast TTI switching mode may comprise an instruction to the network node to prepare to send the HS-SCCH order upon receiving the request and to send the HS-SCCH order to the UE upon receiving the message indicating that the network node should send the HS-SCCH order. A request to send the HS-SCCH order according to the second fast TTI switching mode may comprise an instruction to the network node to send the HS-SCCH order to the UE at a CFN indicated in the request and to change to the new TTI switching configuration upon receiving the message indicating that the network node should change to the new TTI switching configuration.

In certain embodiments, the received feedback indicating the fast TTI switching mode supported by the network node may be included in one of a RADIO LINK RECONFIGURATION READY message and a RADIO LINK RECONFIGURATION FAILURE message. The received feedback indicating the fast TTI switching mode supported by the network node may be included in a RADIO LINK RECONFIGURATION READY message, and the communicated one of the message indicating that the network node should send the HS-SCCH order and the message indicating to the network node that the network node should change to the new TTI switching configuration may comprise a RADIO LINK RECONFIGURATION COMMIT message. The communicated message may comprise the message indicating that the network node should send the HS-SCCH order, and the RADIO LINK RECONFIGURATION COMMIT message may include an activation delay comprising timing information sent to the UE by the RNC, the activation delay for use by the network node to determine when the network node should change to the new TTI switching configuration.

In certain embodiments, the request to send the HS-SCCH order according to one of the first or second fast TTI switching mode may be included in a RADIO LINK RECONFIGURATION REQUEST message. A request to send the HS-SCCH order according to the first fast TTI switching mode may comprise an instruction to the network node to send the HS-SCCH order to the UE upon receiving the request to send the HS-SCCH order to the UE. A request to send the HS-SCCH order according to the second fast TTI switching mode may comprise an instruction to the network node to send the HS-SCCH order to the UE at a CFN indicated in the request to send the HS-SCCH order. The received feedback indicating the fast TTI switching mode supported by the network node may be included in a RADIO LINK RECONFIGURATION RESPONSE message.

Also disclosed is a radio network controller. The radio network controller comprises one or more processors. The one or more processors are configured to communicate, to a network node, a request to send a HS-SCCH order to a UE according to one of a first or second fast TTI switching mode, the HS-SCCH order indicating that the UE should perform TTI switching. The one or more processors are configured to receive, from the network node in response to the communicated request to send the HS-SCCH order to the UE, feedback indicating a fast TTI switching mode supported by the network node.

Certain embodiments of the present disclosure may provide one or more technical advantages. For example, certain embodiments may enable the network to use different alternatives for sending the HS-SCCH order without causing ambiguity. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 5A and 5B illustrate an example of an explicit feedback indicator that may be included in a Positive message, in accordance with certain embodiments;

FIG. 6 illustrates an example of an explicit feedback indicator that may be included in a Negative message, in accordance with certain embodiments;

FIG. 7 illustrates an example of an explicit indication of the requested mode of sending an HS-SCCH order mode, in accordance with certain embodiments;

DETAILED DESCRIPTION

Figure 1:
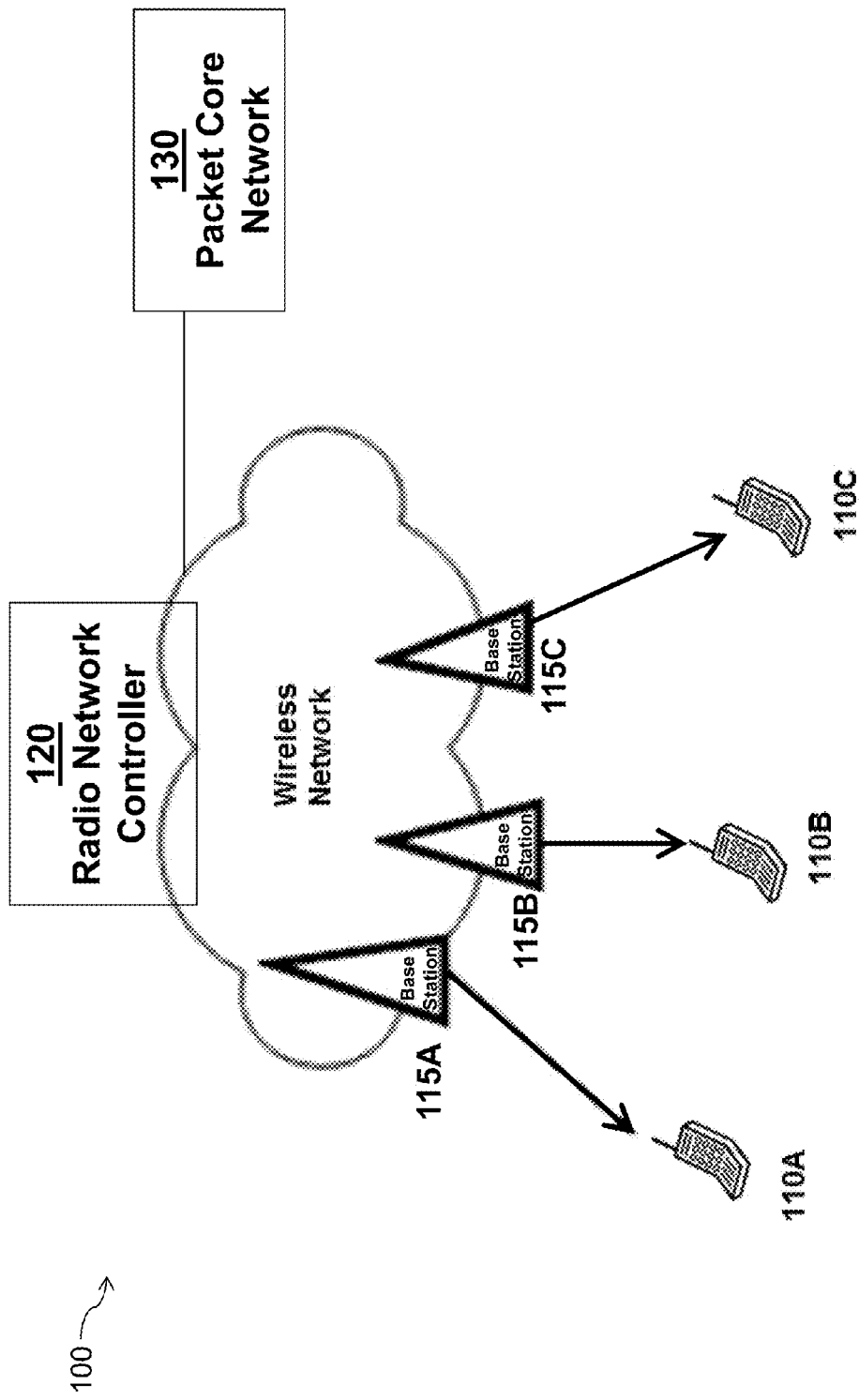
FIG. 1 is a block diagram illustrating an embodiment of a network, in accordance with certain embodiments.

As described above, the HS-SCCH order instructs the UE to go to a new fast TTI switching configuration. A network node may send the HS-SCCH order to the UE according to one or more modes. Introducing multiple modes of requesting that a network node send the HS-SCCH order can cause ambiguity. If the ambiguity resulting from the use of different modes for sending the HS-SCCH order is not handled, it may cause mismatch of the configuration in the network node and UE. The mismatch of the configuration at the network node and UE may lead to unsynchronized behavior or even drops. Thus, when different modes of sending the HS-SCCH order are introduced, there is a need to for a method of handling the ambiguity.

The present disclosure contemplates various embodiments that may reduce or eliminate the ambiguity associated with sending the HS-SCCH order. As one example, in certain embodiments a network node may send capability information to an RNC. The capability information may be sent from the network node to the RNC to indicate what modes of sending the HS-SCCH order the network node supports. As another example, certain embodiments may allow the network node to choose and feedback the method of sending the HS-SCCH order it supports, which allows the RNC to act accordingly. In such a case, an explicit support feedback may be introduced in the response message from the network node to the RNC. Thus, when the network node is requested to send the HS-SCCH order according to a particular mode, the network node can use the support feedback to indicate in the response message from the network node to the RNC whether the network node supports sending the HS-SCCH order according to the requested mode. As yet another example, in certain embodiments, an explicit indication of how the sending of the HS-SCCH order has been requested may be introduced, for example, in a RADIO LINK RECONFIGURATION PREPARE message. Network nodes supporting the requested mode can continue the procedure. Network nodes not supporting the requested mode of sending the HS-SCCH order have a chance to send feedback, such as by adding the feedback information in the RADIO LINK RECONFIGURATION READY message, or by initiating the Radio Link Failure procedure. As still another example, certain embodiments may provide new ways to trigger the network node to send the HS-SCCH order and to go to the new fast TTI switching configuration.

Depending on the fast TTI switching mode requested for sending the HS-SCCH order, the RNC may request the network node to send the HS-SCCH order either at the reception of the message or at a certain point in time. The RNC may send the UE information for the TTI switching hand shake. In certain embodiments, the RNC may send the information about the TTI switching handshake that the RNC sent to the UE to the network node. Thus, both the network node and the UE will know about the related timing. After that, the network node can send out the HS-SCCH order, and both the network node and the UE will go to the new TTI according to the specification.

FIG. 1 illustrates an example wireless communications network 100, in accordance with certain embodiments. Network 100 includes one or more wireless device(s) 110 (which may be interchangeably referred to as UEs 110), network node(s) 115 (which may be interchangeably referred to as Node B or eNBs 115), radio network controller(s) 120, and core network node(s) 130. A wireless device 110 may communicate with a network node 115 over a wireless interface. For example, wireless device 110 may transmit wireless signals to network node 115 and/or receive wireless signals from network node 115. The wireless signals may contain voice traffic, data traffic, control signals, and/or any other suitable information. In some embodiments, an area of wireless signal coverage associated with a radio network node 115 may be referred to as a cell.

Network node 115 may interface with radio network controller 120. Radio network controller 120 may control network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding.

In some embodiments, core network node 130 may manage the establishment of communication sessions and various other functionality for wireless device 110. Wireless device 110 may exchange certain signals with core network node 130 using the non-access stratum layer. In non-access stratum signaling, signals between wireless device 110 and core network node 130 may be transparently passed through the radio access network. Example embodiments of wireless device 110, network node 115, and other network nodes (such as radio network controller 120 or core network node 130) are described with respect to FIGS. 10, 11, and 12, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between UEs or between a UE and another communication device (such as a landline telephone). Furthermore, the present disclosure contemplates that the various embodiments may be implemented in any appropriate type of telecommunication system supporting any suitable communication standards and using any suitable components, and are applicable to any radio access technology (RAT) or multi-RAT systems in which a UE receives and/or transmits signals (e.g., data). For example, network 200 may be any suitable network, such as an LTE network (FDD or TDD), UTRA network, CDMA network, WiMAX, GSM network, or any other suitable network employing any one or more radio access technologies (RATs) for cellular operation. The various embodiments described herein may be applicable to LTE FDD/TDD, WCDMA/HSPA, GSM/GERAN, Wi Fi, WLAN, WiMAX, CDMA2000, or any other suitable RAT.

Figure 2:
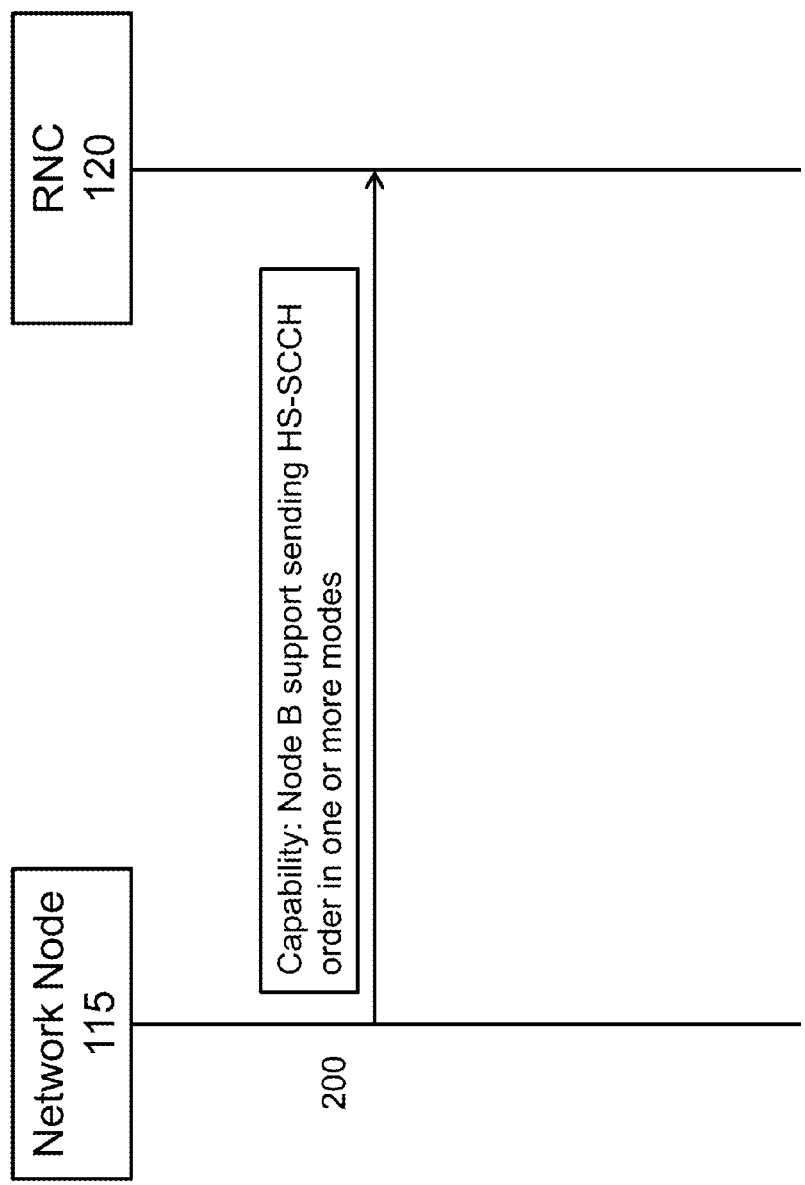
FIG. 2 is a signal flow diagram illustrating a network node communicating capability information to an RNC, in accordance with certain embodiments.

FIG. 2 is a signal flow diagram illustrating network node 115 sending capability information to RNC 120, in accordance with certain embodiments. As described above, network node 115 may support one or more modes of sending the HS-SCCH order. For example, network node 115 may support both a first mode of sending the HS-SCCH order and a second mode, support only the first mode, support only the second mode, or support any combination of the first and second modes and any other suitable modes of sending the HS-SCCH order. In certain embodiments, network node 115 has the ability to indicate to RNC 120 which modes of sending the HS-SCCH order network node 115 supports.

For example, at step 200, network node 115 sends capability information to RNC 120. The capability information sent from network node 115 to RNC 120 may indicate one or more modes of sending the HS-SCCH order that network node 115 supports. In some embodiments, it may be desirable that RNC 120 only use the mode indicated as supported by network node 115 in the capability information. The capability information can be sent in any suitable manner. For example, in certain embodiments the capability information may be sent in a new message from network node 115 to RNC 120. As another example, the capability information may be sent in the existing AUDIT and RESOURCE STATUS INDICATION messages.

As described above, Radio Link Reconfiguration procedures may be used for requesting that network node 115 send the HS-SCCH order. For example, network node 115 may use one of two types of Radio Link Reconfiguration procedures: Synchronized Radio Link Reconfiguration and Unsynchronized Radio Link Reconfiguration. Synchronized Radio Link Reconfiguration is a three-step process, while Unsynchronized Radio Link Reconfiguration is a two-step process. The two types of Radio Link Reconfiguration procedures are described in more detail below with respect to FIGS. 3 and 4.

Figure 3:
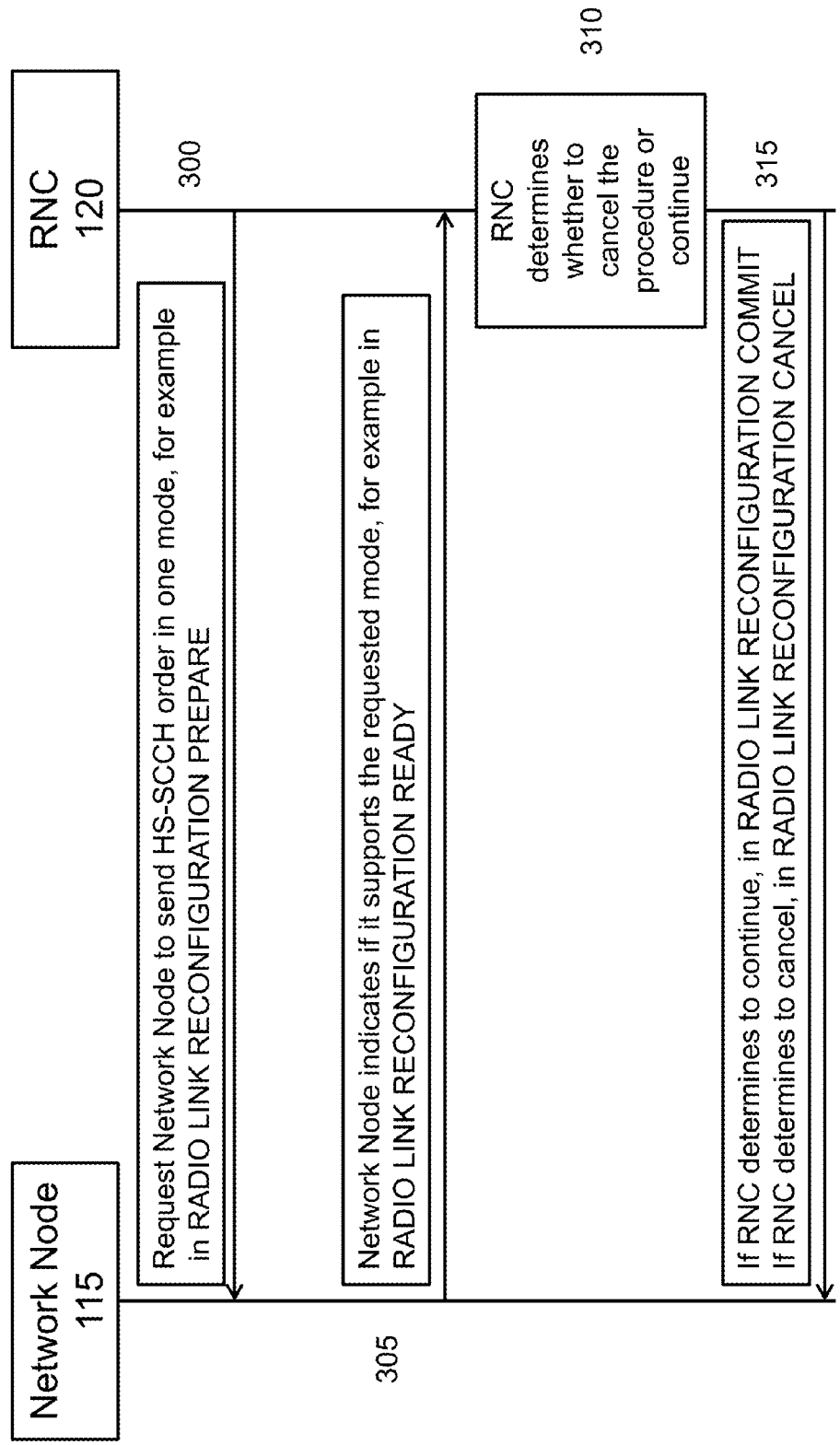
FIG. 3 is a signal flow diagram illustrating a network node sending feedback information to an RNC using synchronized radio link reconfiguration procedures, in accordance with certain embodiments.

FIG. 3 is a signal flow diagram illustrating network node 115 sending feedback information to RNC 120 using synchronized radio link reconfiguration procedures, in accordance with certain embodiments. More particularly, FIG. 3 illustrates the introduction of an explicit feedback indication(s) that allows network node 115 to indicate to RNC 120 one or more modes of sending the HS-SCCH order it supports.

As noted above, Synchronized Radio Link Reconfiguration is a three-step approach. At step 300, RNC 120 requests network node 115 to send the HS-SCCH order according to a particular fast TTI switching mode. There may be one or more ways in which network node 115 could send the HS-SCCH order. For example, a request to send the HS-SCCH order according to a first mode ("Mode 1"), may be an instruction to network node 115 to prepare to send the HS-SCCH order upon receiving the request and to send the HS-SCCH order to a UE 110 upon receiving another message indicating that the network node should send the HS-SCCH order to the UE according to the fast TTI switching mode supported by the network node. Mode 1, for example, may correspond to a legacy way of sending the HS-SCCH order. A request to send the HS-SCCH order according to a second mode ("Mode 2") may be an instruction for network node 115 to send the HS-SCCH order to the UE at a CFN indicated in the request to send the HS-SCCH order. Mode 2, for example, may correspond to an alternative way of sending the HS-SCCH order. The request to send the HS-SCCH order may be sent in any suitable manner using any suitable message. For example, when Synchronized Radio Link Reconfiguration is used, RNC 120 may send the request to send the HS-SCCH order using a RADIO LINK RECONFIGURATION PREPARE MESSAGE.

At step 305, network node 115 communicates feedback to RNC 120 indicating one or more fast TTI switching modes supported by network node 115. In certain embodiments, the feedback indicating one or more fast TTI switching modes supported by network node 115 may be sent both when network node 115 supports the requested fast TTI switching mode and when network node 115 does not support the requested fast TTI switching mode. In certain embodiments, however, network node 115 may only send the feedback when network node 115 does not support the requested fast TTI switching mode. Network node 115 may indicate the one or more fast TTI switching modes it supports in any suitable manner and using any suitable message. The explicit feedback indication(s) can be introduced in a new message, or can use any suitable existing message. Network node 115 may send the feedback in the positive response or negative response (e.g., failure message). For example, if network node 115 is using Synchronized Radio Link Reconfiguration, network node 115 may use a RADIO LINK RECONFIGURATION READY message to indicate to RNC 120 the one or more fast TTI switching modes supported by network node 115.

At step 310, RNC 120 determines whether to cancel the Radio Link Reconfiguration procedure or continue. If RNC 120 determines to continue the procedure, at step 315 RNC 120 may send a RADIO LINK RECONFIGURATION COMMIT message to network node 115. Upon receiving the RADIO LINK RECONFIGURATION COMMIT message, the behavior of network node 115 may vary depending on the fast TTI switching mode being used. For example, if Mode 1 is being used, network node 115 may wait until it receives the RADIO LINK RECONFIGURATION COMMIT message, and then send the HS-SCCH order. As another example. If Mode 2 is being used, network node 115 will send the HS-SCCH order at the CFN indicated in the request to send the HS-SCCH order described above with respect to step 300. In such a case, upon receiving the RADIO LINK RECONFIGURATION COMMIT message, network node 115 will go to the new configuration accordingly. If RNC 120 determines to cancel, RNC 120 may send a RADIO LINK RECONFIGURATION CANCEL message to network node 115.

To illustrate, consider the following examples. As a first example, assume RNC 120 uses the RADIO LINK RECONFIGURATION PREPARE message to request that network node 115 send the HS-SCCH order according to Mode 2. In such a case, there are at least two options for sending feedback indicating the one or more fast TTI switching modes supported by network node 115. According to the first option, in certain embodiments network node 115 could send the feedback in a positive message, such as the RADIO LINK RECONFIGURATION READY message, as illustrated in FIG. 3, indicating it supports sending the HS-SCCH order according to Mode 1 but does not support sending the HS-SCCH order according to Mode 2. According to a second option, network node 115 could send the feedback in a negative message, such as the RADIO LINK RECONFIGURATION FAILURE message. In such a case, RNC 120 is informed which Mode network node 115 supports, but the procedure will be terminated.

If the feedback is sent using a positive message, one possibility is RNC 120, if it allows network node 115 to send the HS-SCCH order according to Mode 1, will send the "Activation Delay" in the RADIO LINK RECONFIGURATION COMMIT message, and let network node 115 send the HS-SCCH order according to Mode 1. If RNC 120 does not allow network node 115 to send the HS-SCCH order according to Mode 1, RNC 120 will not send the RADIO LINK RECONFIGURATION COMMIT message. In such a case, RNC 120 may cancel the ongoing Radio Link Reconfiguration.

As a second example, assume RNC 120 uses the RADIO LINK RECONFIGURATION PREPARE message to request that network node 115 send the HS-SCCH order according to Mode 1. In such a case, there are at least two options for sending feedback indicating the one or more fast TTI switching modes supported by network node 115. A first option is that network node 115 could send feedback in a positive message, such as the RADIO LINK RECONFIGURATION READY message, indicating it supports sending the HS-SCCH order according to Mode 2 but does not support sending HS-SCCH order according to Mode 1. Another option is that network node 115 may send feedback in a negative message, such as the RADIO LINK RECONFIGURATION FAILURE message. In such a case, RNC 120 is informed which Mode network node 115 supports, but the procedure will be terminated.

If network node 115 sends the feedback in the positive message, and RNC 120 supports sending the HS-SCCH order according to Mode 2, it may cancel the current configuration and send the RADIO LINK RECONFIGURATION PREPARE message requesting that network node 115 send the HS-SCCH order according to Mode 2. If RNC 120 only supports sending the HS-SCCH order according to Mode 1, it will not send the RADIO LINK RECONFIGURATION COMMIT message. In some cases, RNC 120 may further cancel the ongoing Radio Link Reconfiguration.

Figure 4:
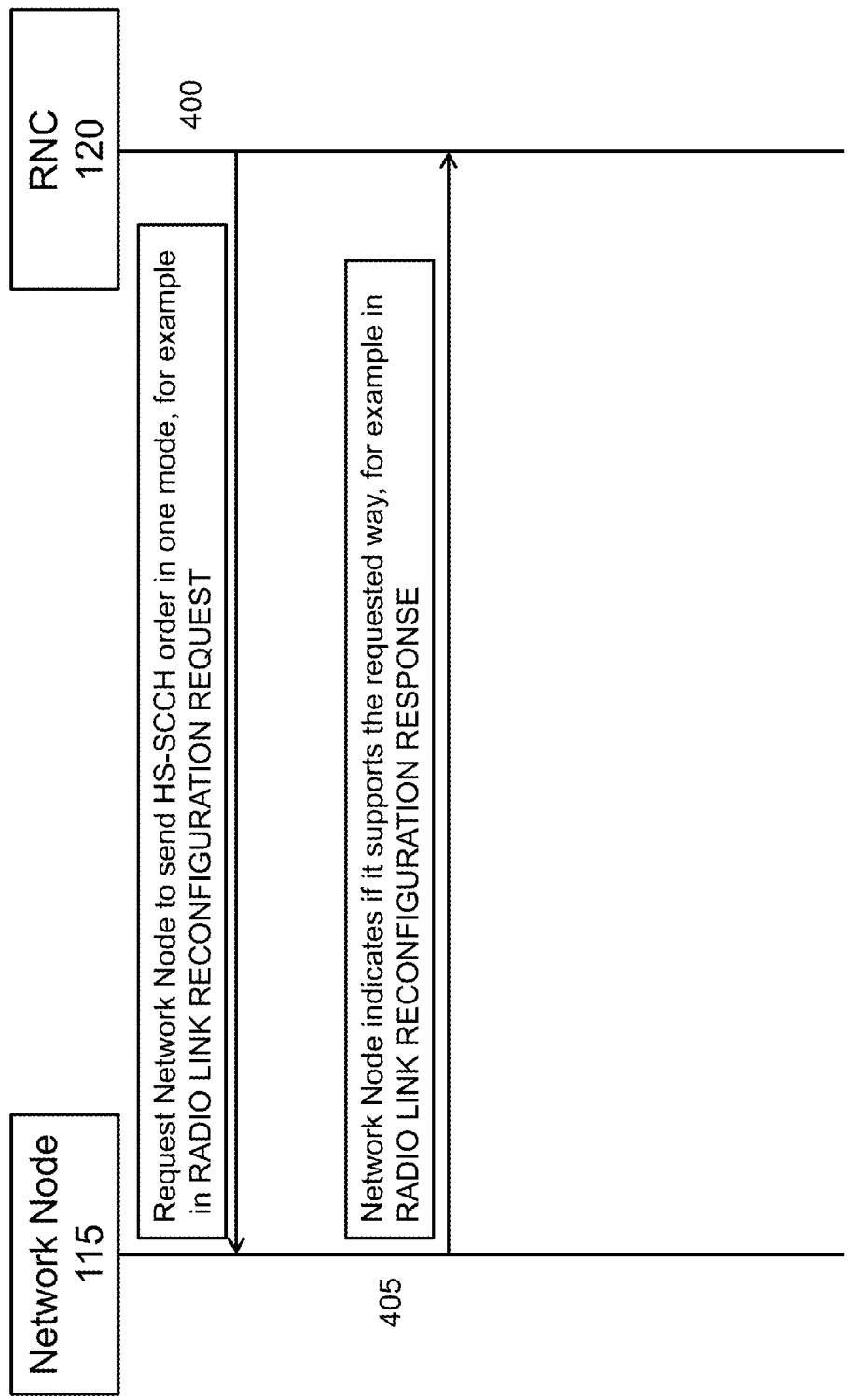
FIG. 4 is a signal flow diagram illustrating a network node sending feedback information to an RNC using unsynchronized radio link reconfiguration procedures, in accordance with certain embodiments.

FIG. 4 is a signal flow diagram illustrating network node 115 sending feedback information to RNC 120 using unsynchronized radio link reconfiguration procedures, in accordance with certain embodiments. Unsynchronized Radio Link Reconfiguration is a two-step process. At step 400, RNC 120 sends a RADIO LINK RECONFIGURATION REQUEST message to network node 115. The RADIO LINK RECONFIGURATION REQUEST message requests that network node 115 send the HS-SCCH order according to a particular fast TTI switching mode. At step 405, network node 115 communicates feedback to RNC 120 indicating one or more fast TTI switching modes it supports. For example, if Mode 1 is used, then network node 115 will send the HS-SCCH order upon receiving the RADIO LINK RECONFIGURATION REQUEST message. If Mode 2 is used, network node 115 will send the HS-SCCH order at the CFN indicated in the RADIO LINK RECONFIGURATION REQUEST message.

Figure 5A:
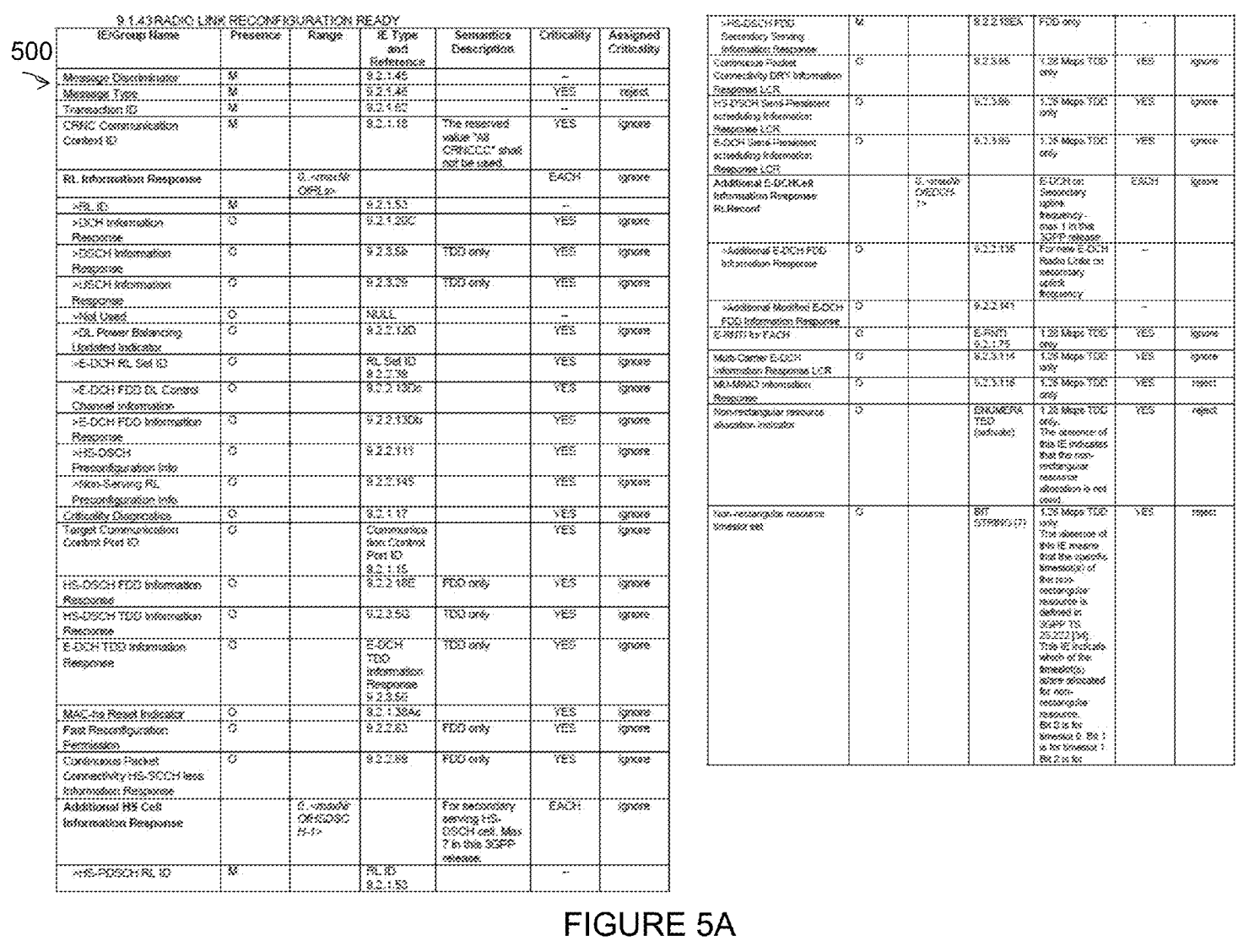

FIGS. 5A and 5B illustrate an example of an explicit feedback indicator that may be included in a Positive message, in accordance with certain embodiments. More particularly, FIGS. 5A and 5B illustrate a table of RADIO LINK RECONFIGURATION READY information elements (IEs) and their associated parameters. As shown in FIG. 5B, IE/Group Name 505 "sending HS-SCCH order support mode indicator" may be used to send the explicit feedback described above in relation to FIG. 3 as part of a positive message. For example, IE/Group Name 505 may be used to indicate the one or more modes of sending the HS-SCCH order that network node 115 supports. Although FIGS. 5A and 5B illustrate one example, the IE names, values, criticality or other parameters may be defined in any suitable manner and in any suitable messages.

FIG. 6 illustrates an example of an explicit feedback indicator that may be included in a Negative message, in accordance with certain embodiments. More particularly, FIG. 6 illustrates a table of RADIO LINK RECONFIGURATION FAILURE IEs and their associated parameters. In particular, IE/Group Name 605 "sending HS-SCCH order support mode indicator" may be used to send the explicit feedback described above in relation to FIG. 3 as part of a negative message. For example, IE 605 may be used to indicate the one or more modes of sending the HS-SCCH order that network node 115 supports. Although FIG. 6 illustrates one example, the IE names, values, criticality or other parameters may be defined in any suitable manner and in any suitable messages.

FIG. 7 illustrates an example of introducing an explicit indication of the requested mode of sending the HS-SCCH order, in accordance with certain embodiments. More particularly, FIG. 7 illustrates a table of RADIO LINK RECONFIGURATION COMMIT IEs and their associated parameters. In particular, IE/Group Name 705 "sending HS-SCCH mode" may be used to indicate which mode of sending of HS-SCCH order has been requested by RNC 120. Although FIG. 7 illustrates one example, the IE names, values, criticality or other parameters may be defined in any suitable manner and in any suitable messages.

In certain embodiments, IE 605 may be introduced to allow RNC 120 to provide an explicit indication in the RADIO LINK RECONFIGURATION COMMIT message how it requested the HS-SCCH order to be sent. In this way, network node 115 has a chance to check if it has done what was requested before continuing the RADIO LINK RECONFIGURATION COMMIT. If not, network node 115 could then initiate the RADIO LINK FAILURE procedure.

In certain embodiments, a new cause value may be introduced to inform RNC 120 of the problem in the RADIO LINK FAILURE procedure.

Figure 8:
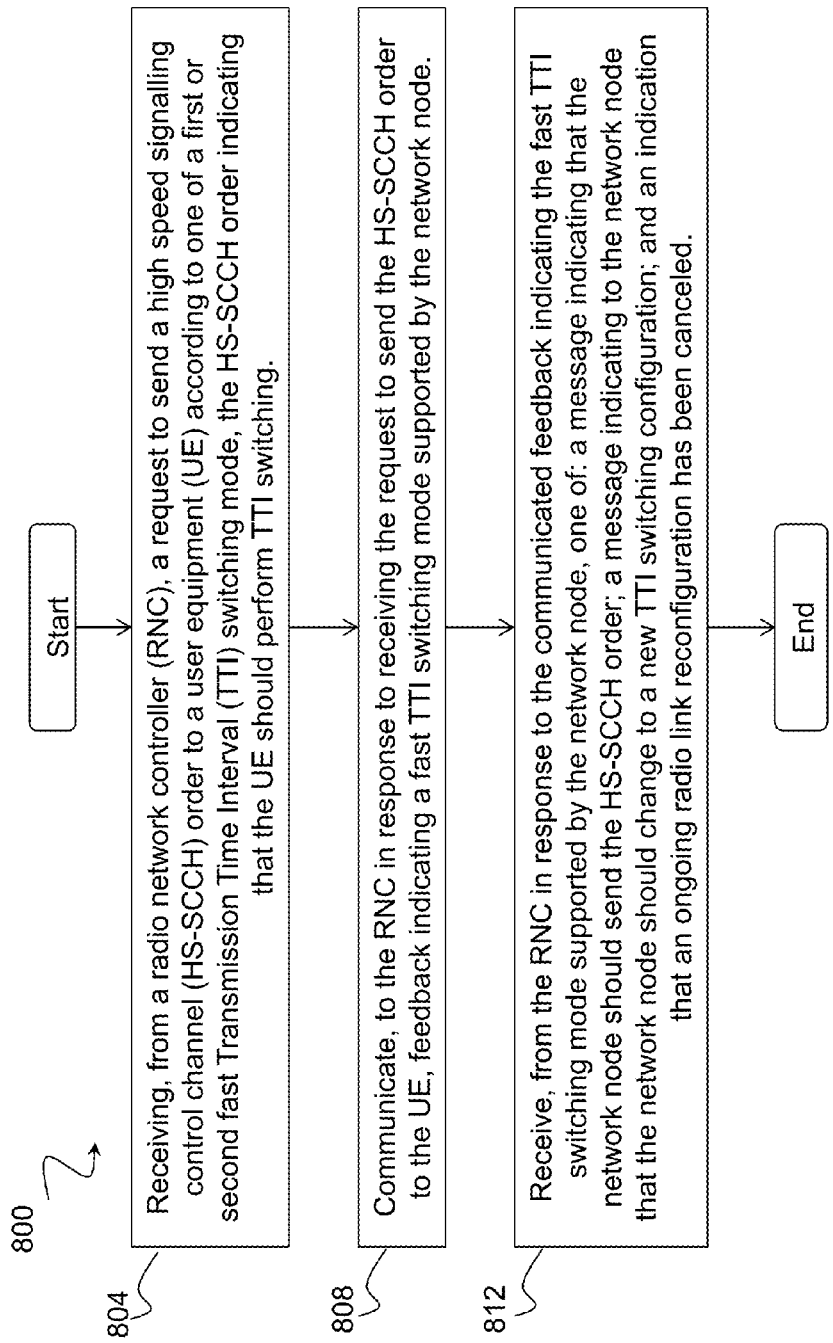
FIG. 8 is a flow chart illustrating a method in a network node, in accordance with certain embodiments.

FIG. 8 is a flow chart illustrating a method 800 in a network node, in accordance with certain embodiments. The method begins at step 804, where the network node receives, from a radio network controller (RNC), a request to send a high speed signaling control channel (HS-SCCH) order to a user equipment (UE) according to one of a first or second fast Transmission Time Interval (TTI) switching mode, the HS-SCCH order indicating that the UE should perform TTI switching.

At step 808, the network node communicates, to the RNC in response to receiving the request to send the HS-SCCH order to the UE, feedback indicating a fast TTI switching mode supported by the network node.

At step 812, the network node receives, from the RNC in response to the communicated feedback indicating the fast TTI switching mode supported by the network node, one of: a message indicating that the network node should send the HS-SCCH order; a message indicating to the network node that the network node should change to a new TTI switching configuration; and an indication that an ongoing radio link reconfiguration has been canceled. In certain embodiments, the method may further comprise communicating capability information to the RNC prior to receiving the request to send the HS-SCCH order to the UE, the capability information indicating one or more fast TTI switching modes supported by the network node.

As described above, in some cases the network node and RNC may use Synchronized Radio Link Reconfiguration. In such a case, in certain embodiments the request to send the HS-SCCH order to the UE according to one of the first or second fast TTI switching mode may be included in a RADIO LINK RECONFIGURATION PREPARE message. A request to send the HS-SCCH order according to the first fast TTI switching mode may comprise an instruction to the network node to prepare to send the HS-SCCH order upon receiving the request and to send the HS-SCCH order to the UE upon receiving the message indicating that the network node should send the HS-SCCH order. A request to send the HS-SCCH order according to the second fast TTI switching mode may comprise an instruction to the network node to send the HS-SCCH order to the UE at a connection frame number (CFN) indicated in the request and to change to the new TTI switching configuration upon receiving the message indicating that the network node should change to the new TTI switching configuration.

The communicated feedback indicating the fast TTI switching mode supported by the network node may be included in one of a RADIO LINK RECONFIGURATION READY message and a RADIO LINK RECONFIGURATION FAILURE message. In some cases, the communicated feedback indicating the fast TTI switching mode supported by the network node may be included in a RADIO LINK RECONFIGURATION READY message, and the received one of the message indicating that the network node should send the HS-SCCH order and the message indicating to the network node that the network node should change to the new TTI switching configuration may comprise a RADIO LINK RECONFIGURATION COMMIT message. The received message may comprise the message indicating that the network node should send the HS-SCCH order, and the RADIO LINK RECONFIGURATION COMMIT message may include an activation delay comprising timing information sent to the UE by the RNC, the activation delay for use by the network node to determine when the network node should change to the new TTI switching configuration.

As described above, in some cases the network node and RNC may use Unsynchronized Radio Link Reconfiguration. In such a case, in certain embodiments the request to send the HS-SCCH order according to one of the first or second fast TTI switching mode may be included in a RADIO LINK RECONFIGURATION REQUEST message. A request to send the HS-SCCH order according to the first fast TTI switching mode may comprise an instruction to the network node to send the HS-SCCH order to the UE upon receiving the request to send the HS-SCCH order to the UE. A request to send the HS-SCCH order according to the second fast TTI switching mode may comprise an instruction to the network node to send the HS-SCCH order to the UE at a connection frame number (CFN) indicated in the request to send the HS-SCCH order. The communicated feedback indicating the fast TTI switching mode supported by the network node may be included in a RADIO LINK RECONFIGURATION RESPONSE message.

Figure 9:
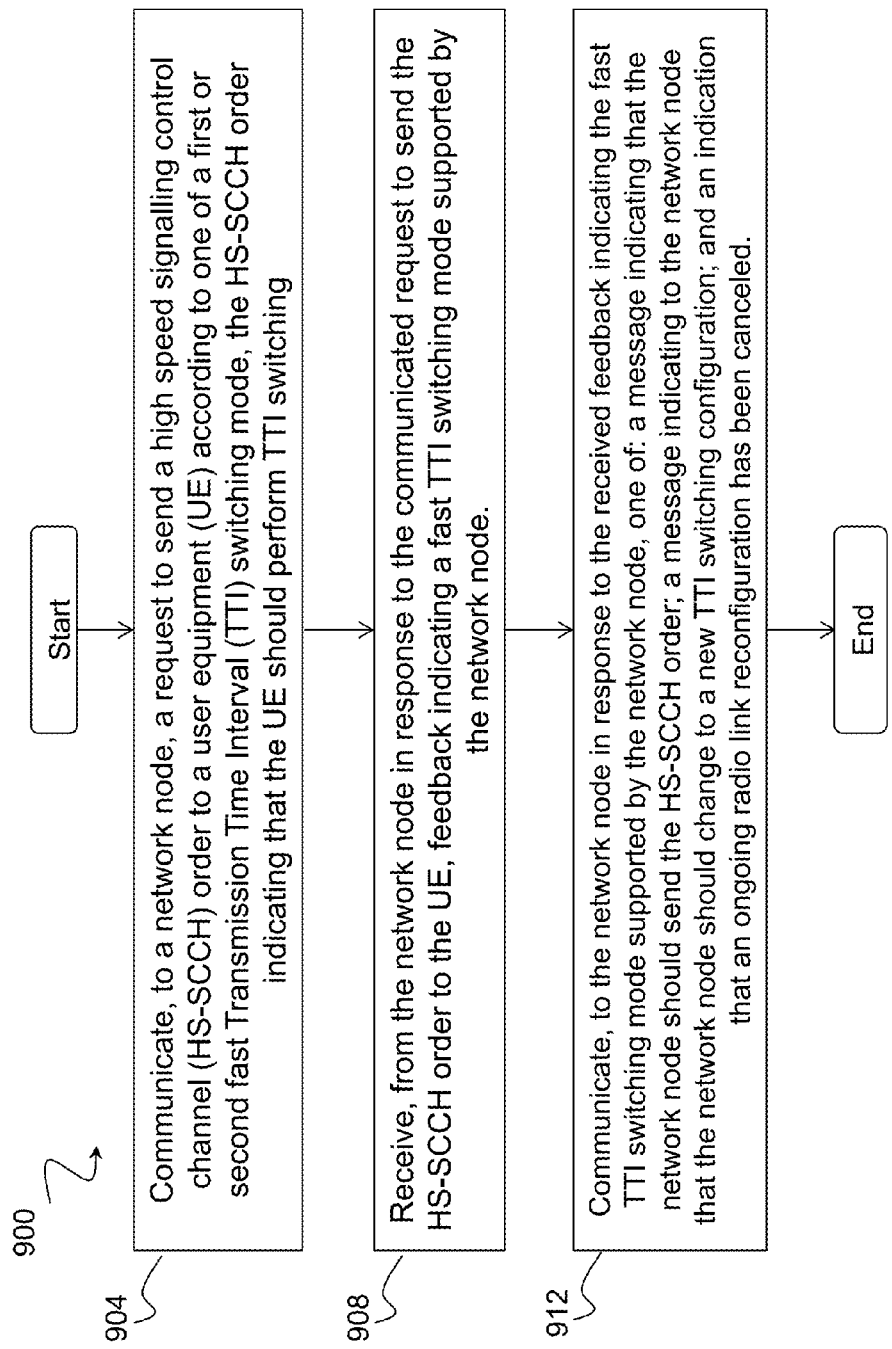
FIG. 9 is a flow chart illustrating a method in a radio network controller, in accordance with certain embodiments.

FIG. 9 is a flow chart illustrating a method 900 in a radio network controller, in accordance with certain embodiments. The method begins at step 904, where the radio network controller communicates, to a network node, a request to send a high speed signaling control channel (HS-SCCH) order to a user equipment (UE) according to one of a first or second fast Transmission Time Interval (TTI) switching mode, the HS-SCCH order indicating that the UE should perform TTI switching.

At step 908, the RNC receives, from the network node in response to the communicated request to send the HS-SCCH order to the UE, feedback indicating a fast TTI switching mode supported by the network node.

At step 912, the RNC communicates, to the network node in response to the received feedback indicating the fast TTI switching mode supported by the network node, one of: a message indicating that the network node should send the HS-SCCH order; a message indicating to the network node that the network node should change to a new TTI switching configuration; and an indication that an ongoing radio link reconfiguration has been canceled. In certain embodiments, the method may further comprise receiving capability information from the network node prior to communicating the request to send the HS-SCCH order to the UE, the capability information indicating one or more fast TTI switching modes supported by the network node.

As described above, in some cases the network node and RNC may use Synchronized Radio Link Reconfiguration. In such a case, in certain embodiments the request to send the HS-SCCH order to the UE according to one of the first or second fast TTI switching mode may be included in a RADIO LINK RECONFIGURATION PREPARE message. A request to send the HS-SCCH order according to the first fast TTI switching mode may comprise an instruction to the network node to prepare to send the HS-SCCH order upon receiving the request and to send the HS-SCCH order to the UE upon receiving the message indicating that the network node should send the HS-SCCH order. A request to send the HS-SCCH order according to the second fast TTI switching mode may comprise an instruction to the network node to send the HS-SCCH order to the UE at a connection frame number (CFN) indicated in the request and to change to the new TTI switching configuration upon receiving the message indicating that the network node should change to the new TTI switching configuration.

The received feedback indicating the fast TTI switching mode supported by the network node may be included in one of a RADIO LINK RECONFIGURATION READY message and a RADIO LINK RECONFIGURATION FAILURE message. In some cases, the received feedback indicating the fast TTI switching mode supported by the network node may be included in a RADIO LINK RECONFIGURATION READY message, and the communicated one of the message indicating that the network node should send the HS-SCCH order and the message indicating to the network node that the network node should change to the new TTI switching configuration may comprise a RADIO LINK RECONFIGURATION COMMIT message. In certain embodiments, the communicated message may comprise the message indicating that the network node should send the HS-SCCH order, and the RADIO LINK RECONFIGURATION COMMIT message may include an activation delay comprising timing information sent to the UE by the RNC, the activation delay for use by the network node to determine when the network node should change to the new TTI switching configuration.

As described above, in some cases the network node and RNC may use Unsynchronized Radio Link Reconfiguration. In such a case, in certain embodiments the request to send the HS-SCCH order according to one of the first or second fast TTI switching mode may be included in a RADIO LINK RECONFIGURATION REQUEST message. A request to send the HS-SCCH order according to the first fast TTI switching mode may comprise an instruction to the network node to send the HS-SCCH order to the UE upon receiving the request to send the HS-SCCH order to the UE. A request to send the HS-SCCH order according to the second fast TTI switching mode may comprise an instruction to the network node to send the HS-SCCH order to the UE at a connection frame number (CFN) indicated in the request to send the HS-SCCH order. The received feedback indicating the fast TTI switching mode supported by the network node may be included in a RADIO LINK RECONFIGURATION RESPONSE message.

Figure 10:
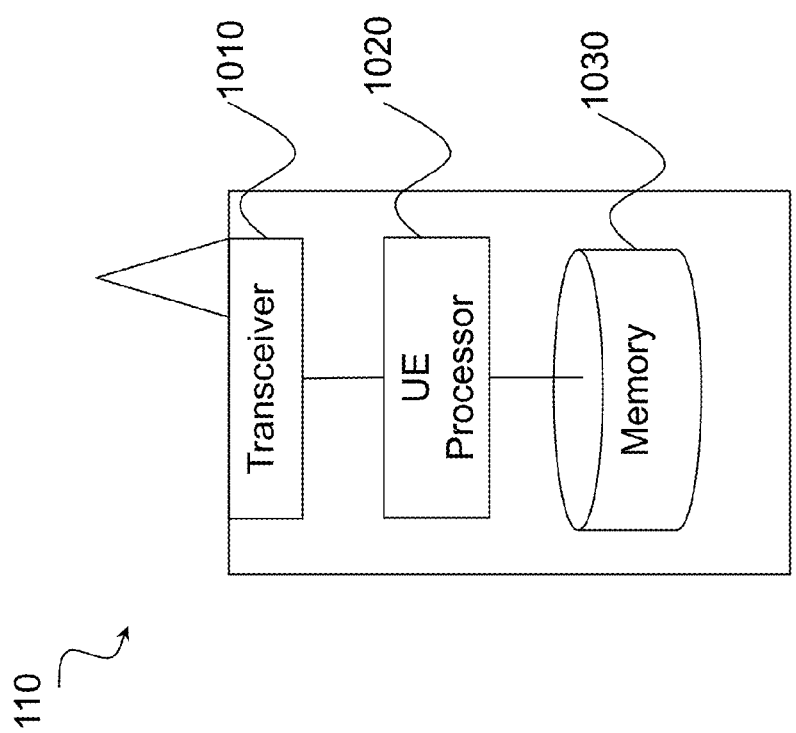
FIG. 10 is a schematic block diagram of an exemplary wireless device, in accordance with certain embodiments.

FIG. 10 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 1010, processor 1020, and memory 1030. In some embodiments, transceiver 1010 facilitates transmitting wireless signals to and receiving wireless signals from network node 115 (e.g., via an antenna), processor 1020 executes instructions to provide some or all of the functionality described above as being provided by wireless device 110, and memory 1030 stores the instructions executed by processor 1020.

Processor 1020 may include any suitable combination of hardware and software implemented in one or more modules to execute instructions and manipulate data to perform some or all of the described functions of wireless device 110. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Other embodiments of wireless device 110 may include additional components beyond those shown in FIG. 10 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. The determining module may include or be included in processor 1020. The determining module may include analog and/or digital circuitry configured to perform any of the functions of the determining module and/or processor 1020. The functions of the determining module described above may, in certain embodiments, be performed in one or more distinct modules.

The communication module may perform the transmission functions of wireless device 110. The communication module may transmit messages to one or more of network nodes 115 of network 100. The communication module may include a transmitter and/or a transceiver, such as transceiver 1010. The communication module may include circuitry configured to wirelessly transmit messages and/or signals. In particular embodiments, the communication module may receive messages and/or signals for transmission from the determining module.

The receiving module may perform the receiving functions of wireless device 110. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

Figure 11:
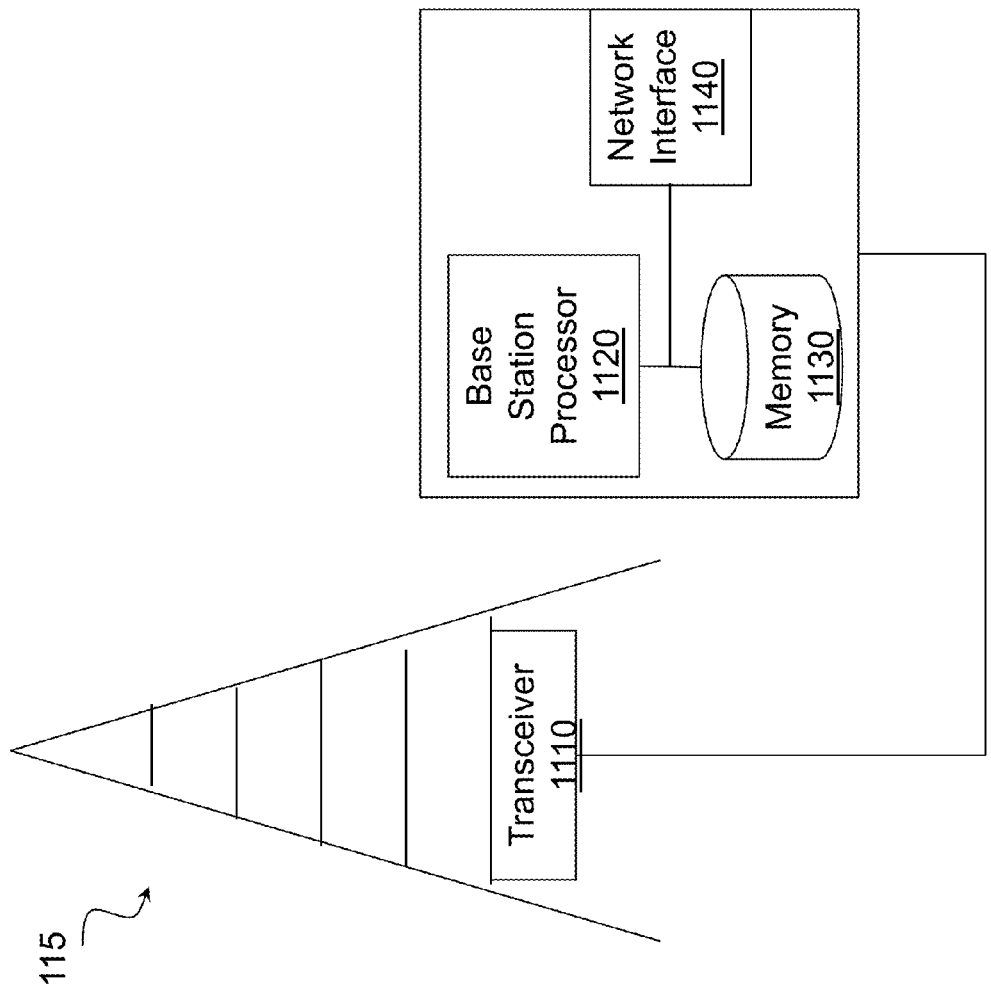
FIG. 11 is a schematic block diagram of an exemplary network node, in accordance with certain embodiments.

FIG. 11 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1110, processor 1120, memory 1130, and network interface 1140. In some embodiments, transceiver 1110 facilitates transmitting wireless signals to and receiving wireless signals from wireless device 110 (e.g., via an antenna), processor 1120 executes instructions to provide some or all of the functionality described above as being provided by a network node 115, memory 1130 stores the instructions executed by processor 1120, and network interface 1140 communicates signals to backend network components, such as a gateway, switch, router, Internet, Public Switched Telephone Network (PSTN), core network nodes 130, radio network controllers 120, etc.

Processor 1120 may include any suitable combination of hardware and software implemented in one or more modules to execute instructions and manipulate data to perform some or all of the described functions of network node 115. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1140 is communicatively coupled to processor 1120 and may refer to any suitable device operable to receive input for network node 115, send output from network node 115, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 1120 of FIG. 11. In certain embodiments, the functions of two or more of the various modules may be combined into a single module.

The determining module may perform the processing functions of network node 115. The communication module may perform the transmission functions of network node 115. The communication module may transmit messages to one or more of wireless devices 110 or RNC 120. For example, the communication module may communicate, to the RNC in response to receiving a request to send the HS-SCCH order to wireless device 110, feedback indicating a fast TTI switching mode supported by network node 115. As another example, the communication module may communicate capability information to RNC 120 prior to receiving the request to send the HS-SCCH order to wireless device 110, the capability information indicating one or more fast TTI switching modes supported by network node 115. The communication module may include a transmitter and/or a transceiver, such as transceiver 1110. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from wireless device 110 or RNC 120. For example, the receiving module may receive, from RNC 120, a request to send an HS-SCCH order to wireless device 110 according to one of a first or second fast TTI switching mode, the HS-SCCH order indicating that the UE should perform TTI switching. As another example, the receiving module may receive, from RNC 120 in response to the communicated feedback indicating the fast TTI switching mode supported by the network node, one of: a message indicating that network node 115 should send the HS-SCCH order; a message indicating to network node 115 that network node 115 should change to a new TTI switching configuration; and an indication that an ongoing radio link reconfiguration has been canceled. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
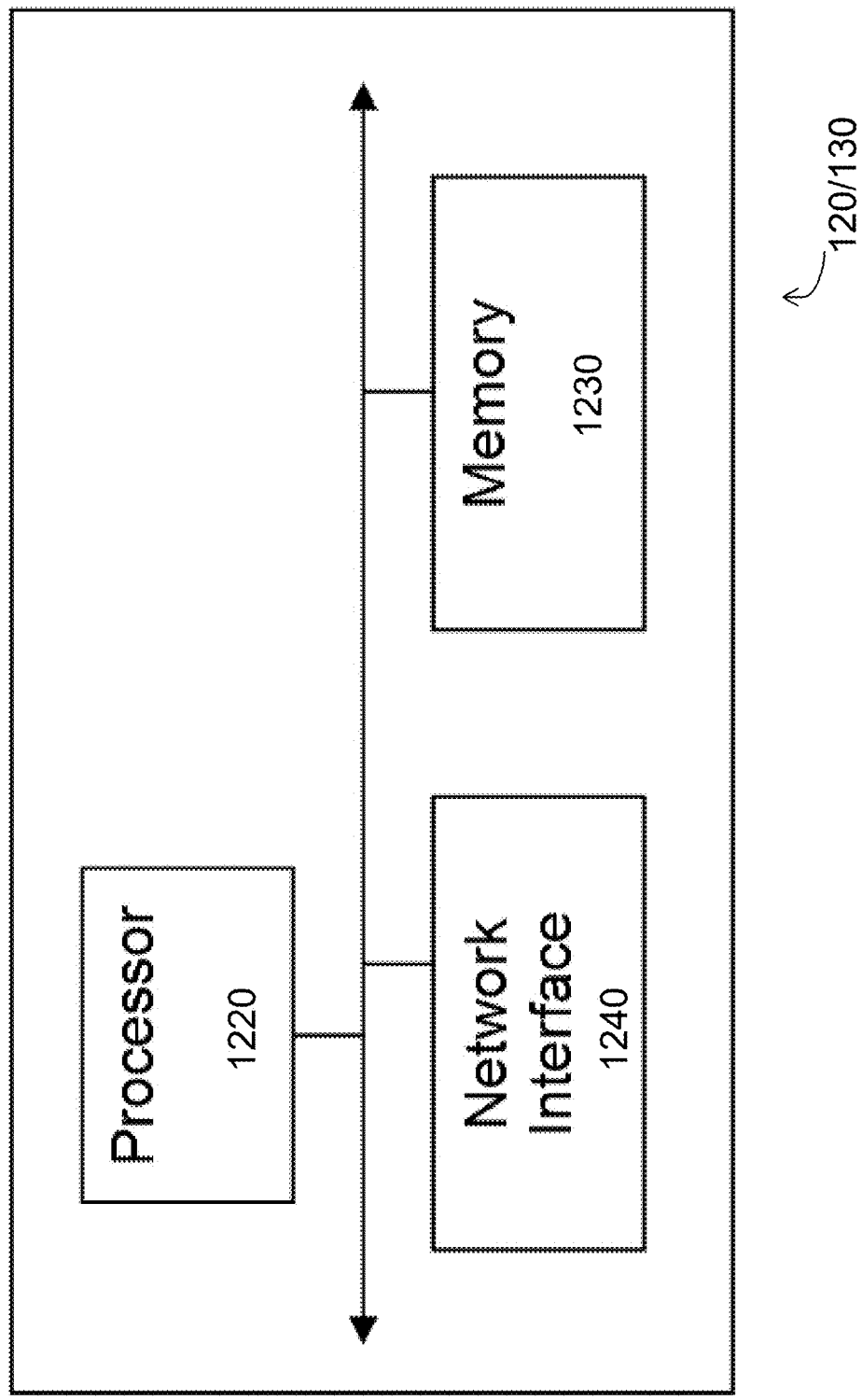
FIG. 12 is a schematic block diagram of an exemplary radio network controller or core network node, in accordance with certain embodiments.

FIG. 12 is a block schematic of an exemplary radio network controller 120 or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller 120 or core network node 130 include processor 1220, memory 1230, and network interface 1240. In some embodiments, processor 1220 executes instructions to provide some or all of the functionality described above as being provided by the network node, memory 1230 stores the instructions executed by processor 1220, and network interface 1240 communicates signals to any suitable node, such as a gateway, switch, router, Internet, Public Switched Telephone Network (PSTN), network nodes 115, radio network controllers 120, core network nodes 130, etc.

Processor 1220 may include any suitable combination of hardware and software implemented in one or more modules to execute instructions and manipulate data to perform some or all of the described functions of the radio network controller 120 or core network node 130. In some embodiments, processor 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processor 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3GPP 3rd Generation Partnership Project
CFN Connection Frame Number
HS-SCCH High Speed-Shared Control Channel
NBAP Node B Application Part
RNC Radio Network Controller
RNSAP Radio Network Subsystem Application Part
RRC Radio Resource Control Protocol
UE User Equipment

The invention claimed is:

1. A method in a network node, comprising:
receiving, in a RADIO LINK RECONFIGURATION PREPARE message from a radio network controller (RNC), a request to send a high speed signalling control channel (HS-SCCH) order to a user equipment (UE) according to one of a first or second fast Transmission Time Interval (TTI) switching mode, the HS-SCCH order indicating that the UE should perform TTI switching;
communicating, to the RNC in response to receiving the request to send the HS-SCCH order to the UE, feedback indicating a fast TTI switching mode supported by the network node;
receiving, from the RNC in response to the communicated feedback indicating the fast TTI switching mode supported by the network node, one of:
  a message indicating that the network node should send the HS-SCCH, wherein a request to send the HS-SCCH order according to the first fast TTI switching mode comprises an instruction to the network node to prepare to send the HS-SCCH order upon receiving the request and to send the HS-SCCH order to the UE upon receiving the message indicating that the network node should send the HS-SCCH order;
  a message indicating to the network node that the network node should change to a new TTI switching configuration, wherein a request to send the HS-SCCH order according to the second fast TTI switching mode comprises an instruction to the network node to send the HS-SCCH order to the UE at a connection frame number (CFN) indicated in the request and to change to the new TTI switching configuration upon receiving the message indicating that the network node should change to the new TTI switching configuration; and
  an indication that an ongoing radio link reconfiguration has been canceled.

2. The method of claim 1, wherein:
the communicated feedback indicating the fast TTI switching mode supported by the network node is included in a RADIO LINK RECONFIGURATION READY message; and
the received one of the message indicating that the network node should send the HS-SCCH order and the message indicating to the network node that the network node should change to the new TTI switching configuration comprises a RADIO LINK RECONFIGURATION COMMIT message.

3. The method of claim 2, wherein:
the received message comprises the message indicating that the network node should send the HS-SCCH order; and
the RADIO LINK RECONFIGURATION COMMIT message includes an activation delay comprising timing information sent to the UE by the RNC, the activation delay for use by the network node to determine when the network node should change to the new TTI switching configuration.

4. The method of claim 1, wherein the communicated feedback indicating the fast TTI switching mode supported by the network node is included in one of:
a RADIO LINK RECONFIGURATION READY message; and
a RADIO LINK RECONFIGURATION FAILURE message.

5. The method of claim 1, further comprising communicating capability information to the RNC prior to receiving the request to send the HS-SCCH order to the UE, the capability information indicating one or more fast TTI switching modes supported by the network node.

6. A method in a radio network controller (RNC), comprising:
communicating, in a RADIO LINK RECONFIGURATION PREPARE message to a network node, a request to send a high speed signalling control channel (HS-SCCH) order to a user equipment (UE) according to one of a first or second fast Transmission Time Interval (TTI) switching mode, the HS-SCCH order indicating that the UE should perform TTI switching;
receiving, from the network node in response to the communicated request to send the HS-SCCH order to the UE, feedback indicating a fast TTI switching mode supported by the network node;
communicating, to the network node in response to the received feedback indicating the fast TTI switching mode supported by the network node, one of:
a message indicating that the network node should send the HS-SCCH order, wherein a request to send the HS-SCCH order according to the first fast TTI switching mode comprises an instruction to the network node to prepare to send the HS-SCCH order upon receiving the request and to send the HS-SCCH order to the UE upon receiving the message indicating that the network node should send the HS-SCCH order;
a message indicating to the network node that the network node should change to a new TTI switching configuration, wherein a request to send the HS-SCCH order according to the second fast TTI switching mode comprises an instruction to the network node to send the HS-SCCH order to the UE at a connection frame number (CFN) indicated in the request and to change to the new TTI switching configuration upon receiving the message indicating that the network node should change to the new TTI switching configuration; and
an indication that an ongoing radio link reconfiguration has been canceled.

7. The method of claim 6, wherein:
the received feedback indicating the fast TTI switching mode supported by the network node is included in a RADIO LINK RECONFIGURATION READY message; and
the communicated one of the message indicating that the network node should send the HS-SCCH order and the message indicating to the network node that the network node should change to the new TTI switching configuration comprises a RADIO LINK RECONFIGURATION COMMIT message.

8. The method of claim 7, wherein:
the communicated message comprises the message indicating that the network node should send the HS-SCCH order; and
the RADIO LINK RECONFIGURATION COMMIT message includes an activation delay comprising timing information sent to the UE by the RNC, the activation delay for use by the network node to determine when the network node should change to the new TTI switching configuration.

9. The method of claim 6, wherein the received feedback indicating the fast TTI switching mode supported by the network node is included in one of:
a RADIO LINK RECONFIGURATION READY message; and
a RADIO LINK RECONFIGURATION FAILURE message.

10. The method of claim 6, further comprising receiving capability information from the network node prior to communicating the request to send the HS-SCCH order to the UE, the capability information indicating one or more fast TTI switching modes supported by the network node.

11. A network node, comprising:
one or more processors configured to:
receive, in a RADIO LINK RECONFIGURATION PREPARE message from a radio network controller (RNC), a request to send a high speed signalling control channel (HS-SCCH) order to a user equipment (UE) according to one of a first or second fast Transmission Time Interval (TTI) switching mode, the HS-SCCH order indicating that the UE should perform TTI switching;
communicate, to the RNC in response to receiving the request to send the HS-SCCH order to the UE, feedback indicating a fast TTI switching mode supported by the network node; and
receive, from the RNC in response to the communicated feedback indicating the fast TTI switching mode supported by the network node, one of:
a message indicating that the network node should send the HS-SCCH order, wherein a request to send the HS-SCCH order according to the first fast TTI switching mode comprises an instruction to the network node to prepare to send the HS-SCCH order upon receiving the request and to send the HS-SCCH order to the UE upon receiving the message indicating that the network node should send the HS-SCCH order;
a message indicating to the network node that the network node should change to a new TTI switching configuration, wherein a request to send the HS-SCCH order according to the second fast TTI switching mode comprises an instruction to the network node to send the HS-SCCH order to the UE at a connection frame number (CFN) indicated in the request and to change to the new TTI switching configuration upon receiving the message indicating that the network node should change to the new TTI switching configuration; and
an indication that an ongoing radio link reconfiguration has been canceled.

12. The network node of claim 11, wherein:
the communicated feedback indicating the fast TTI switching mode supported by the network node is included in a RADIO LINK RECONFIGURATION READY message; and
one of the message indicating that the network node should send the HS-SCCH order and the message indicating to the network node that the network node should change to a new TTI switching configuration comprises a RADIO LINK RECONFIGURATION COMMIT message.

13. The network node of claim 12, wherein
the received message comprises the message indicating that the network node should send the HS-SCCH order; and
the RADIO LINK RECONFIGURATION COMMIT message includes an activation delay comprising timing information sent to the UE by the RNC, the activation delay for use by the network node to determine when the network node should change to the new TTI switching configuration.

14. The network node of claim 11, wherein:
the communicated feedback indicating the fast TTI switching mode supported by the network node is included in one of:
a RADIO LINK RECONFIGURATION READY message; and
a RADIO LINK RECONFIGURATION FAILURE message.

15. The network node of claim 11, wherein the one or more processors are further configured to communicate capability information to the RNC prior to receiving the request to send the HS-SCCH order to the UE, the capability information indicating one or more fast TTI switching modes supported by the network node.

16. A radio network controller (RNC), comprising:
one or more processors configured to:
communicate, in a RADIO LINK RECONFIGURATION PREPARE message to a network node, a request to send a high speed signalling control channel (HS-SCCH) order to a user equipment (UE) according to one of a first or second fast Transmission Time Interval (TTI) switching mode, the HS-SCCH order indicating that the UE should perform TTI switching;
receive, from the network node in response to the communicated request to send the HS-SCCH order to the UE, feedback indicating a fast TTI switching mode supported by the network node; and
communicate, to the network node in response to the received feedback indicating the fast TTI switching mode supported by the network node, one of:
a message indicating that the network node should send the HS-SCCH order, wherein a request to send the HS-SCCH order according to the first fast TTI switching mode comprises an instruction to the network node to prepare to send the HS-SCCH order upon receiving the request and to send the HS-SCCH order to the UE upon receiving the message indicating that the network node should send the HS-SCCH order;
a message indicating to the network node that the network node should change to a new TTI switching configuration, wherein a request to send the HS-SCCH order according to the second fast TTI switching mode comprises an instruction to the network node to send the HS-SCCH order to the UE at a connection frame number (CFN) indicated in the request and to change to the new TTI switching configuration upon receiving the message indicating that the network node should change to the new TTI switching configuration; and
an indication that an ongoing radio link reconfiguration has been canceled.

17. The RNC of claim 16, wherein:
the received feedback indicating the fast TTI switching mode supported by the network node is included in a RADIO LINK RECONFIGURATION READY message; and
one of the message indicating that the network node should send the HS-SCCH order and the message indicating to the network node that the network node should change to a new TTI switching configuration comprises a RADIO LINK RECONFIGURATION COMMIT message.

18. The RNC of claim 17, wherein:
the communicated message comprises the message indicating that the network node should send the HS-SCCH order; and
the RADIO LINK RECONFIGURATION COMMIT message includes an activation delay comprising timing information sent to the UE by the RNC, the activation delay for use by the network node to determine when the network node should change to the new TTI switching configuration.

19. The RNC of claim 16, wherein the received feedback indicating the fast TTI switching mode supported by the network node is included in one of:
a RADIO LINK RECONFIGURATION READY message; and
a RADIO LINK RECONFIGURATION FAILURE message.

20. The RNC of claim 16, wherein the one or more processors are further configured to receive capability information from the network node prior to communicating the request to send the HS-SCCH order to the UE, the capability information indicating one or more fast TTI switching modes supported by the network node.

* * * * *